United States Patent [19]
Sirichote et al.

[11] Patent Number: 5,898,585
[45] Date of Patent: Apr. 27, 1999

[54] APPARATUS AND METHOD FOR PROVIDING SUPPLEMENTAL ALTERNATING CURRENT FROM A SOLAR CELL ARRAY

[75] Inventors: Wichit Sirichote; Wirojana Tantraporn; Narong Saengkaew, all of Bangkok, Thailand

[73] Assignee: Premier Global Corporation, Ltd., Bangkok, Thailand

[21] Appl. No.: 08/865,228

[22] Filed: May 29, 1997

[51] Int. Cl.[6] .................................................... H02M 7/48
[52] U.S. Cl. ............................ 363/132; 363/95; 363/136
[58] Field of Search ............................ 363/17, 35, 132, 363/136, 95, 96, 98

[56] References Cited

U.S. PATENT DOCUMENTS

| | | | |
|---|---|---|---|
| 3,946,242 | 3/1976 | Wilkerson | 363/136 |
| 4,445,049 | 4/1984 | Steigerwald | 363/136 |
| 4,680,690 | 7/1987 | Dickerson | 363/97 |
| 5,268,832 | 12/1993 | Kandatsu | 363/95 |
| 5,493,485 | 2/1996 | Okado | 363/56 |
| 5,625,539 | 4/1997 | Nakata et al. | 363/17 |
| 5,668,713 | 9/1997 | Eguchi et al. | 363/95 |
| 5,677,833 | 10/1997 | Bingley | 363/132 |
| 5,719,758 | 2/1998 | Nakata et al. | 363/132 |

FOREIGN PATENT DOCUMENTS

| | | | |
|---|---|---|---|
| 4126353C1 | 1/1993 | Germany | H02M 7/515 |
| 63-124771 | 5/1988 | Japan | H02M 7/48 |

*Primary Examiner*—Jeffrey Sterrett
*Attorney, Agent, or Firm*—Blakely, Sokoloff, Taylor & Zafman

[57] ABSTRACT

A novel solar inverter circuit is used to connect a solar photovoltaic (PV) array with an alternating current (AC) voltage source to convert direct current (DC) power from the PV array to AC power. The solar inverter circuit employs the current-voltage (I-V) characteristic of the PV or solar cell, and an H-Bridge circuit with gate controller. The gate controller synchronizes the H-bridge with the AC voltage source. The PV array and the solar inverter circuit can plug directly into a residential AC plug and provides electrical power as a supplementary AC supply. Electrical energy required by the home appliances is supplied by the municipal AC line and solar energy concurrently. Advantages of the solar inverter circuit of the present invention include the flexibility of using the solar inverter circuit with any number of solar cell panels through the implementation of an impedance transformer, and the implementation of an additional, optional output for DC battery charging.

33 Claims, 6 Drawing Sheets

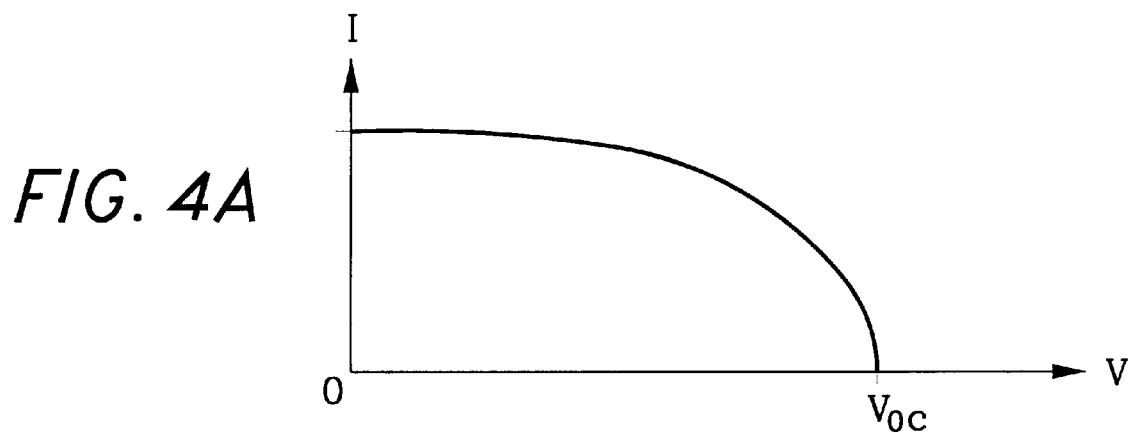
FIG. 4A
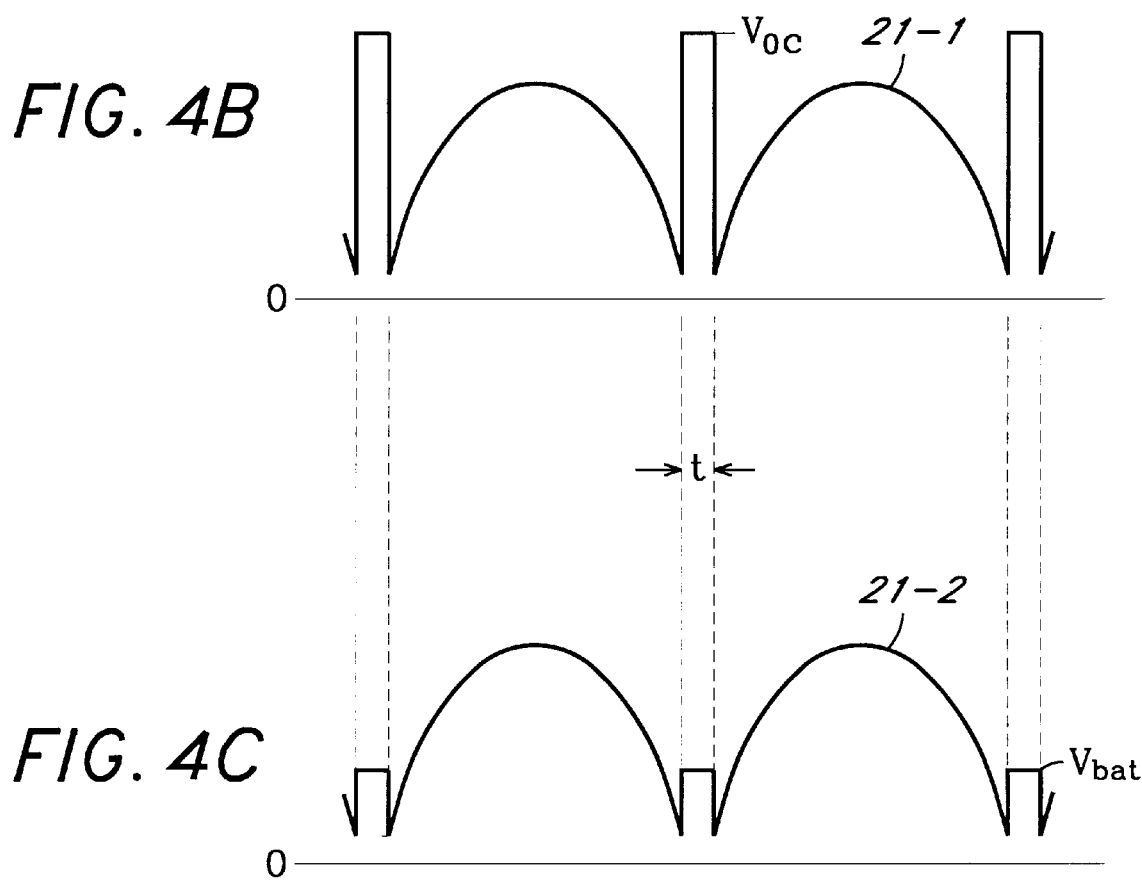
FIG. 4B
FIG. 4C

APPARATUS AND METHOD FOR PROVIDING SUPPLEMENTAL ALTERNATING CURRENT FROM A SOLAR CELL ARRAY

BACKGROUND OF THE INVENTION

1. Field of the Invention

The present invention relates in general to power converters and more particularly, to a solar inverter circuit that: (i) converts direct current (DC) power from a solar photovoltaic array to a counterflowing alternating current (AC) power in response to a reference AC power source, and (ii) generates additional AC power to supplement the reference AC power source.

2. Background of the Related Art

Conversion of direct current (DC) power from solar cells to alternating current (AC) power required in residential AC lines usually employs a large number of batteries for storing DC electrical energy from solar cells during day-time. The batteries serve as a DC voltage source. The DC voltage source is then converted to simulate sinusoidal ac voltage by a number of methods. One such method uses an asynchronous sine-wave generator or a digital technique to mimic an AC voltage having a plurality of DC levels. To couple such converted AC voltage to the residential AC line, the phase, frequency and amplitude of the converted AC voltage must be the same as that in the residential AC line. If these parameters are not synchronized, serious problems to the municipal electrical supply, and/or to the converted solar source would result.

BRIEF DESCRIPTION OF THE DRAWINGS

Description of the various embodiments of the invention is now given, with reference to the numbers in the figures as follows:

FIG. 4A illustrates the current-voltage relationship at the terminals of the solar cell array 3, having an open-circuit voltage value $V_{OC}$.

FIG. 4B illustrates the voltage waveform 21-1 developed across the terminals a and c of the solar cell array of FIG. 1.

FIG. 4C illustrates the voltage waveform 21-2 developed across the terminals a–c of the solar cell array 3 of FIG. 3 depicting the effect of discharging a DC current into the battery 4 and during the time interval t.

SUMMARY OF THE INVENTION

A novel solar inverter circuit is used to connect a solar photovoltaic (PV) array with an alternating current (AC) voltage source to convert direct current (DC) power from the PV array to AC power. The solar inverter circuit employs the current-voltage (I-V) characteristic of the PV or solar cell, and an H-Bridge circuit with gate controller. The gate controller synchronizes the H-bridge with the AC voltage source. The PV array and the solar inverter circuit can plug directly into a residential AC plug and provides electrical power as a supplementary AC supply. Electrical energy required by the home appliances is supplied by the municipal AC line and solar energy concurrently. Advantages of the solar inverter circuit of the present invention include the flexibility of using the solar inverter circuit with any number of solar cell panels through the implementation of an impedance transformer, and the implementation of an additional, optional output for DC battery charging.

DETAILED DESCRIPTION OF THE PRESENT INVENTION

Figure 1:
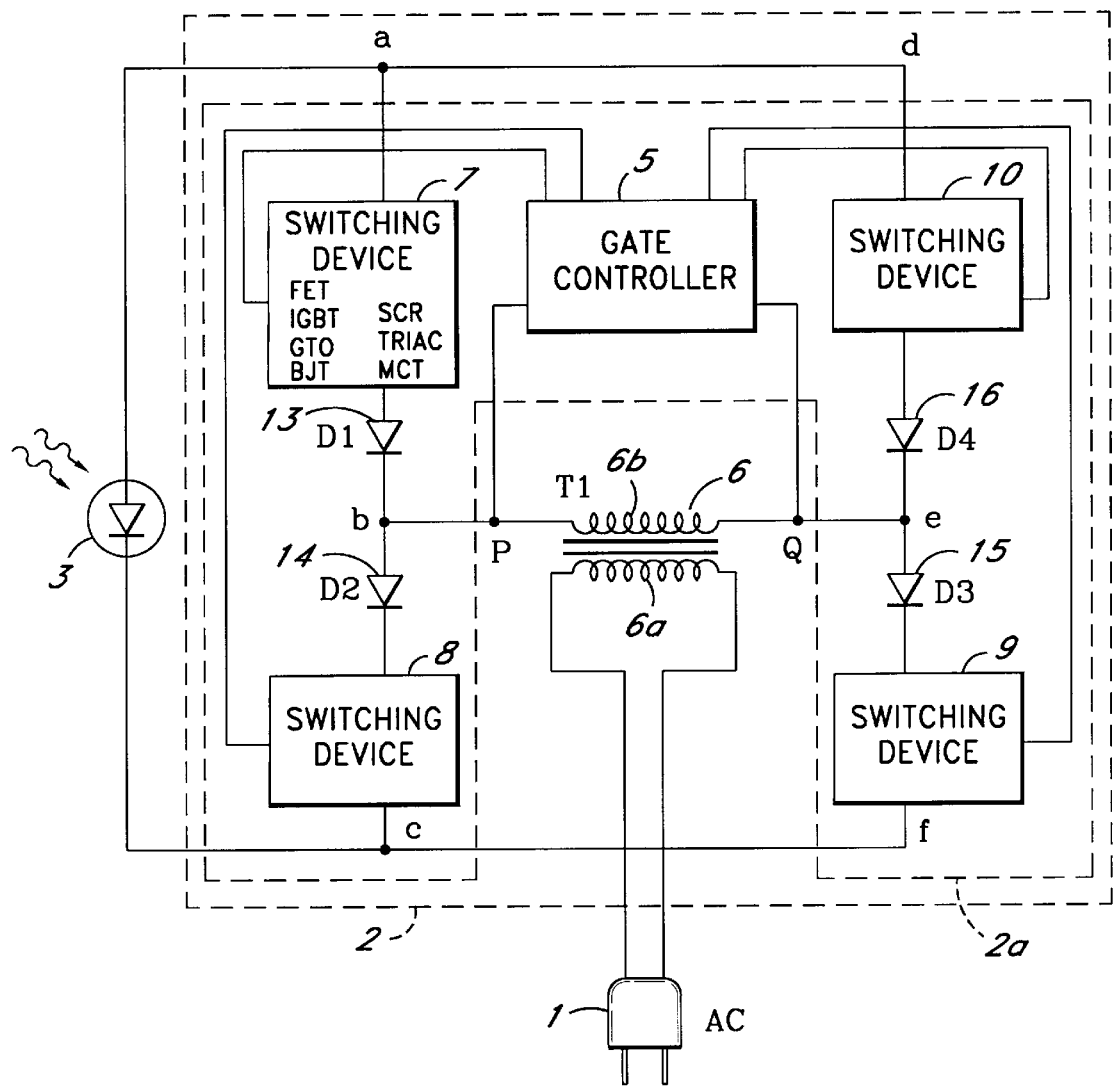
FIG. 1 is a schematic diagram of a first embodiment of the solar inverter circuit 2 of the present invention.

FIG. 1 is a schematic diagram of a first embodiment of the solar inverter circuit of the present invention. An alternating current (AC) source provided via plug 1, provides an AC waveform to the solar inverter circuit 2. Solar energy is received by a solar photovoltaic array or a solar cell array 3, which in turn generates direct current (DC) power that is provided to the solar inverter circuit 2.

As shown in FIG. 1, the solar inverter circuit 2 comprises an H-bridge circuit 2a and a transformer 6. The H-bridge circuit 2a comprises a gate controller circuit 5 and four switching devices 7, 8, 9 and 10. In one embodiment, each switching device 7, 8, 9 and 10 is a Field Effect Transistor (FET). In alternate embodiments, each switching device may be an Insulated Gate Bipolar Transistor (IGBT), a Gate-Turn-Off thyristor (GTO), a Bipolar Junction Transistor (BJT), a Silicon-Controlled-Rectifier (SCR), a bidirectional triode thyristor (TRIAC), a MOS-Controlled Thyristor (MCT), or any other switching devices in which switching can be electronically controlled by applying appropriate signal to the gate terminal of the device. The chosen device is of sufficient current and voltage rating to be safely operating in the circuit. In one embodiment, the H-bridge circuit 2a also comprises four diodes D1, D2, D3 and D4.

Figure 5:
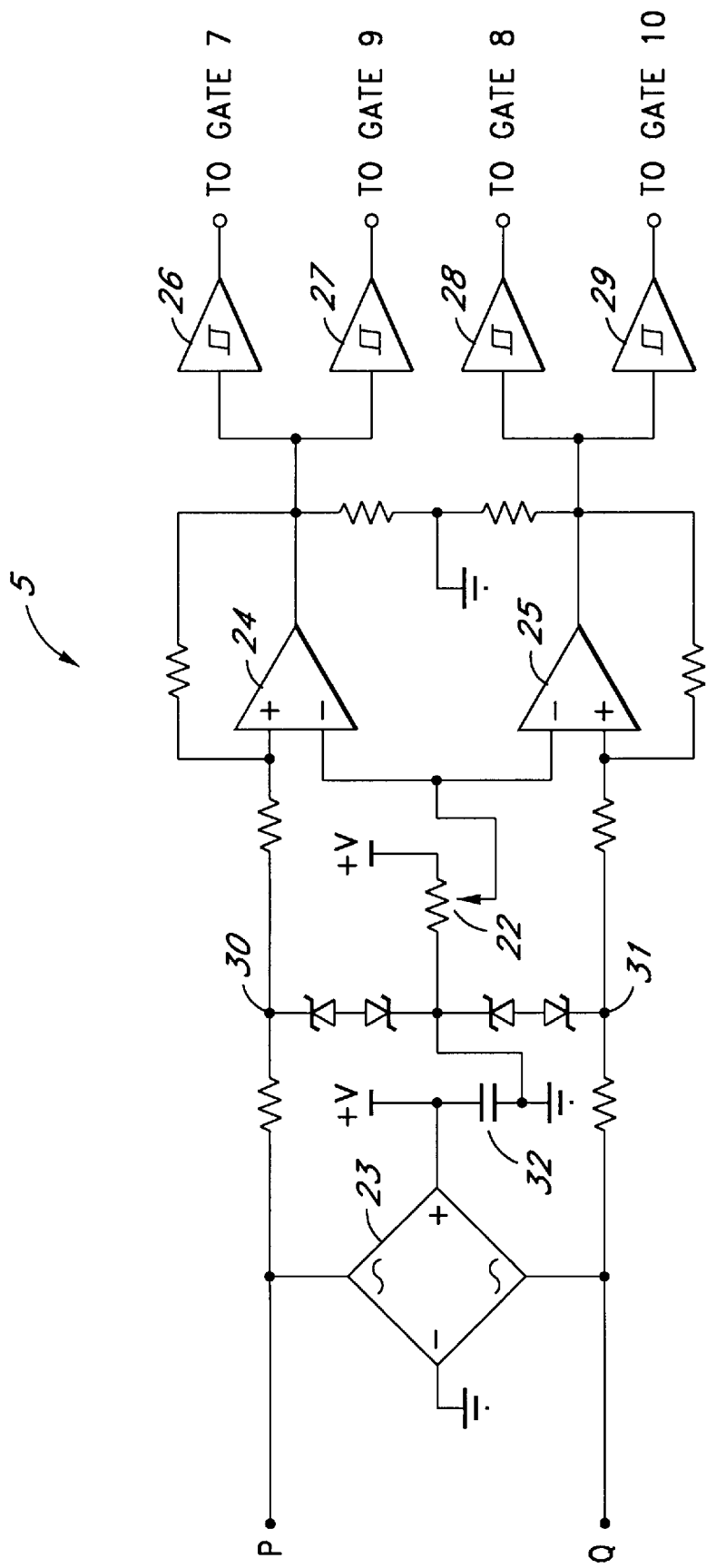
FIG. 5 illustrates one embodiment of the gate controller circuit 5 of FIGS. 1 and 3.

The transformer 6 has a primary coil 6a and a secondary coil 6b. In one preferred embodiment, the transformer 6 is an isolation transformer, in which the primary coil 6a and the secondary coil 6b are not DC-coupled, and is a well-known type of transformer. An example of the gate controller circuit 5, which provides the signals shown in FIGS. 2B and 2C, is shown in FIG. 5. The signals can be generated by other equivalent circuits known to one skilled in the art.

Operation of the solar inverter circuit 2 of FIG. 1 will now be described. In the H-bridge circuit 2a, the gates of the four switching devices 7, 8, 9 and 10 are controlled by the gate controller circuit 5. The input to the gate controller circuit 5 is the voltage $V_{PQ}$ from the secondary coil of the isolation transformer 6. This voltage $V_{PQ}$ is derived from an AC source provided via plug 1. A detailed description of the gate controller circuit 5 and the transformer 6 is provided in the following sections.

Figure 2A:
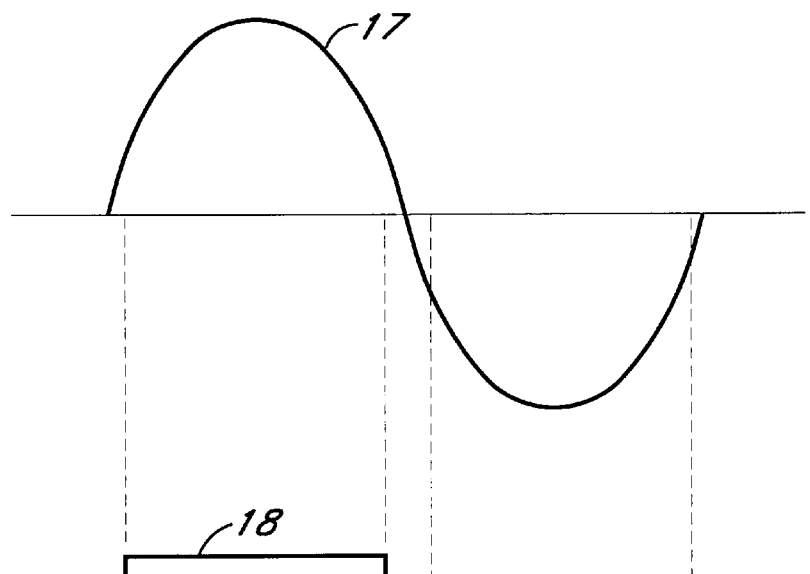
FIG. 2A illustrates the voltage waveform 17 measured across the terminals PQ of the secondary coil 6b of the transformer 6 of FIG. 1, when the primary coil 6a is energized by an AC voltage at the plug 1.
Figure 2B:
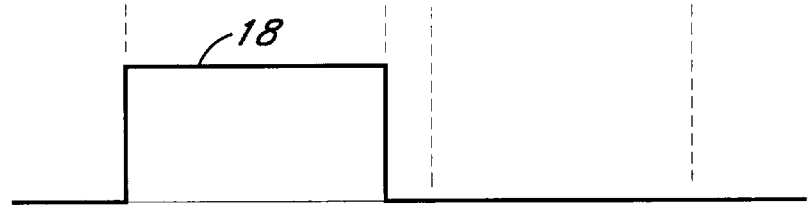
FIG. 2B illustrates the gate voltage on devices 7 and 9 provided by the gate controller circuit 5 during the positive cycle of the voltage waveform 17 of FIG. 2A.
Figure 2C:
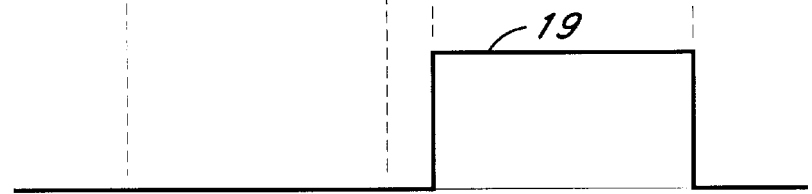
FIG. 2C illustrates the gate voltage on devices 8 and 10 provided by the gate controller circuit 5 during the negative cycle of the voltage waveform 17 of FIG. 2A.

During the positive cycle of the AC voltage $V_{PQ}$, (i.e., P is positive with respect to Q) shown as waveform 17 in FIG. 2A, the gate controller circuit 5 issues a pulse such as the voltage waveform 18 shown in FIG. 2B to turn the switching devices 7 and 9 on and the switching devices 8 and 10 off. When the switching devices 7 and 9 are turned on, the signal path segments ab and ef act as short circuits, while the signal path segments bc and de act as open circuits. In response, the DC current generated by the solar cell array 3 takes the signal path segment ab through the secondary coil of the transformer 6 from node P to node Q, and thence through to the signal path segment ef.

The solar cell array may consist of a number of individual cells connected in series and parallel such that the current-voltage relationship at the array's terminals is shown in FIG. 4A. The magnitude of the open-circuit voltage of the array, $V_{OC}$ in FIG. 4A, also is shown in FIG. 4B. The voltage in FIG. 4A is actually in the opposing direction with respect to the direction of the current flow I. In operation, the voltage $V_{PQ}$ is the opposing voltage provided through the signal path segments, and the current at each instantaneous value of $V_{PQ}$ which is shown as 17 in FIG. 2A, is then shown as the current waveform 20 in FIG. 2D. It is important to note that the H-bridge circuit 2a in FIG. 1 acts in the similar manner during the negative half of the cycle of the voltage $V_{PQ}$ in providing the gate signal 19 in FIG. 2C to turn on the switching devices 8 and 10, and to turn off the switching devices 7 and 9, so that the signal path segments ab and ef are now open circuits while the signal path segments bc and de act as short circuits. In this way, the current flows in a direction opposite to that in the positive cycle, i.e., from Q to P.

Figure 2D:
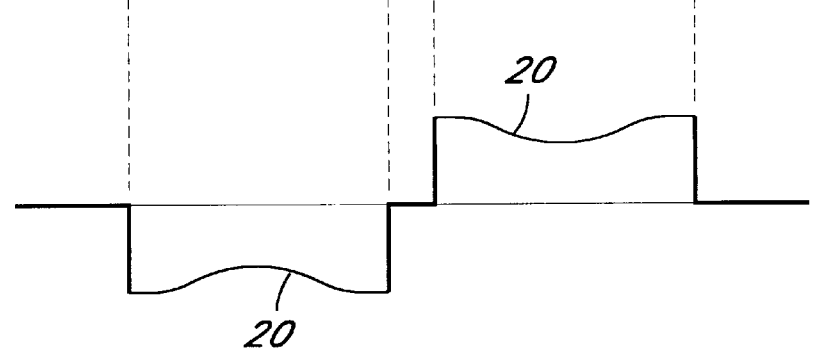
FIG. 2D illustrates the output current waveform $I_{PQ}$ 20 resulting from the inverter operation

In essence, the negative conductance characteristic of the solar cell array (i.e. the direction of the current I is opposite to that of the voltage V mentioned earlier in conjunction with FIG. 4A) yields an AC negative conductance shown in FIG. 2D in comparison with FIG. 2A. It is very important to assert that the current waveform 20 results from the voltage waveform 17 which is $V_{PQ}$, without influencing the $V_{PQ}$ waveform. This is in contrast with a normal conductance operation where the current waveform is in-phase with the voltage waveform.

Figure 3:
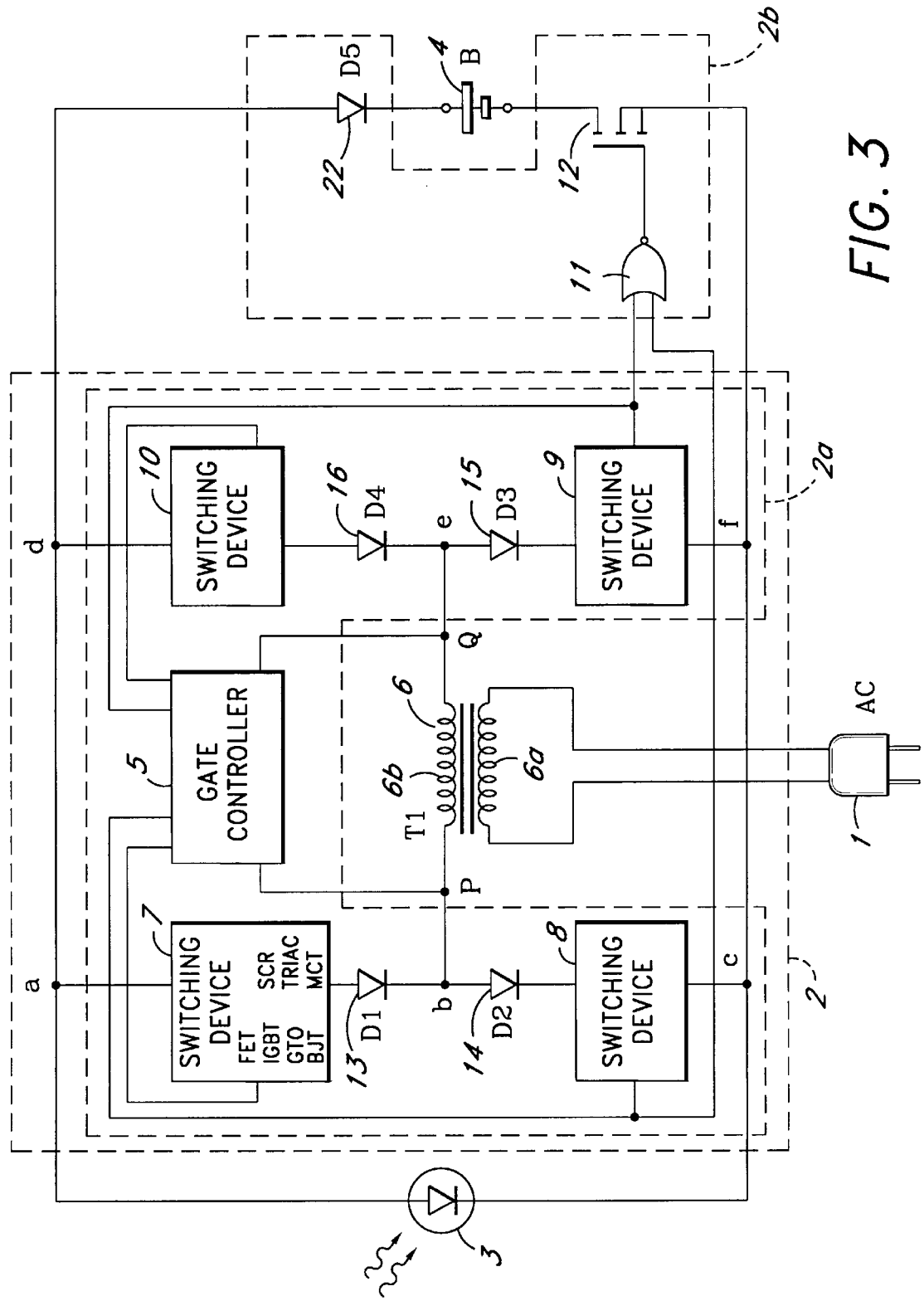
FIG. 3 is a schematic diagram of a second embodiment of the solar inverter circuit 2 of the present invention.

Referring to FIG. 1 and FIG. 3, because the current in the coil 6b flows in the opposite direction to $V_{PQ}$, the current in the coil 6a also flows in the opposite direction to the plug (city plug) voltage, and thus AC power is delivered from the circuit 2a into the city AC power line, without influencing the city AC voltage.

The diodes D1, D2, D3 and D4 are implemented for safety reasons, such as to guard against short-circuiting if current from the solar cell array 3 flows in the wrong direction when the H-bridge circuit 2a malfunctions.

FIG. 3 illustrates a second embodiment of the solar inverter circuit of the present invention. In this second embodiment, the solar inverter circuit 2 also provides a DC battery charging circuit. To ensure proper triggering of the switching devices in the H-bridge circuit 2a configuration, it is necessary to provide a small period of time, t, during which all switching devices 7, 8, 9 and 10 in the H-bridge circuit 2a are in the off-state, so as to prevent mistriggering. Consequently, during this time interval, t, (as shown in FIG. 4B) the DC current from solar cell array 3 is not converted to AC current because there is no current flowing through PQ during t. FIG. 4B illustrates the voltage waveform 21-1 provided across the terminals a and c of the solar cell array 3 without the battery charging circuit 2b.

In this second embodiment, the solar inverter circuit 2 further comprises a battery charging circuit 2b. The battery charging circuit 2b comprises a NOR gate 11, a switching device 12 and a diode D5. The output of the NOR gate 11 goes high only when both the voltage waveforms 18 and 19 are off, i.e., during the time interval t, and is used to cause the switching device 12 to conduct during the time interval t. DC current from solar cell array 3 then passes through the diode D5 and into the battery 4 and the DC current harnessed may be stored in the battery 4 through trickle charging. The voltage waveform developed across the terminals a–c of the solar cell array 3 then becomes the waveform 21-2 as shown in FIG. 4C. It is apparent to one of ordinary skill in the art that the battery 4 may comprise a plurality of batteries that are coupled in series and/or parallel, to have a voltage value $V_{bat}$ such that on the I-V curve of FIG. 4A the product I·V is maximum when $V=V_{bat}$.

FIG. 5 illustrates one embodiment of the gate controller circuit 5 as shown in FIGS. 1 and 3. The input of the gate controller circuit 5 is connected to the secondary turn of the isolation transformer 6, which provides $V_{PQ}$, the voltage waveform 17 as shown in FIG. 2A. The bridge diode 23 and capacitor 32 provide a DC supply for the circuit 5. The operational amplifiers 24 and 25 are configured as voltage comparators, and each generate a square pulse in response to the input voltage waveform 17. In particular, the non-inverting terminal of operational amplifier 24 is coupled to node P, while the non-inverting terminal of operational amplifier 25 is coupled to node Q. The inverting terminals of each operational amplifier 24 and 25 are coupled to a variable resistor 22, which allows the user to set the time interval t, as shown in FIGS. 2D, 4B and 4C. The output of operational amplifier 24 is provided as an input to buffers 26 and 27, which in turn drive the gates of switching devices 7 and 9, respectively. Similarly, the output of operational amplifier 25 is provided as an input to buffers 28 and 29, which in turn generate outputs which drive the gates of switching devices 8 and 10, respectively. The buffers 26, 27, 28 and 29 are used to increase driving current to the switching devices 7, 8, 9 and 10. In one embodiment, the buffers 26, 27, 28 and 29 are Schmitt triggers.

During the positive cycle of the waveform 17, the operational amplifier 24 generates a square pulse, which in turn drives the gates of switching devices 7 and 9, turning on the switching devices 7 and 9. During this cycle, the operational amplifier 25 does not generate any output, and thus, the switching devices 8 and 10 are not turned on. Thus, during the positive cycle, the switching devices 7 and 9 conduct, while the switching devices 8 and 10 do not conduct.

During the negative cycle of the waveform 17, the operational amplifier 25 generates a square pulse, which in turn drives the gates of switching devices 8 and 10, turning on the switching devices 8 and 10. During this negative cycle, the operational amplifier 24 does not generate any output, and thus, the switching devices 7 and 9 are not turned on. Thus, during the negative cycle, the switching devices 8 and 10 conduct and the switching devices 7 and 9 do not conduct.

Simple integrated circuits and operational amplifiers widely available in the market and as known by one of ordinary skill in the art, are used in the gate controller circuit 5 to provide the waveforms 18 and 19 (FIGS. 2B and 2C) from the waveform 17 (FIG. 2A). As described earlier, the width of the pulses 18 and 19 are adjustable, and hence the time interval, t, between the pulses 18 and 19 is also adjustable, affecting the waveform 20 (FIG. 2D) and waveforms 21-1 and 21-2 (FIGS. 4B and 4C, respectively). The time duration t during which a battery is charged can thus be varied, say from 1% to 99%, with concurrent AC power production from 99% to 1% correspondingly. This feature allows the solar inverter circuit 2 to be readily adaptable to the local power consumption needs for immediate AC application as opposed to DC storage for immediate or later use.

One preferred embodiment of the isolation transformer 6 will now be described. In order to optimize the AC power from the solar cell array 3, the "open-circuit voltage" of the solar cell array 3 must be 5%–20% higher than the amplitude of $V_{PQ}$. Because a single solar cell's open-circuit voltage $V_{PQ}$ is less than 1 volt and the "short-circuit current" $I_{SC}$ is only several milliamps, the solar cell array 3 may be commercially available (with series and parallel connected cells) with a specified set of $V_{OC}$ and $I_{SC}$. In order to couple the power generated from the solar cell array 3 to the city grid, for example, 220 Volts (AC), the isolation transformer 6 can be chosen with the transformer-turn-ratio to match the 220 $V_{(AC)}$ with the $V_{PQ}$ needed for the optimal operation of the solar cell array 3. This allows the solar inverter circuit 2 of the present invention to provide 220 V(AC) from any available solar cell array 3, with an arbitrary combination of $V_{OC}$ and $I_{SC}$.

It is apparent to one skilled in the art that an appropriate transformer 6 can be chosen not only to efficiently match the operation of an arbitrary solar cell array 3 to the city grid but also to match operation of the transformer 6 and the solar cell array 3 to any other AC generator, typically a diesel driven one or to an uninterrupted power supply (UPS). It is apparent to one skilled in the art that the consumer can purchase more solar cells to add on to the solar cell array 3 to harness and to generate more AC power from the sun at the user's own convenience and with minor adjustments to the transformer 6. Hence, the solar inverter circuit 2 of the present invention is both versatile and widely applicable.

Figure 6:
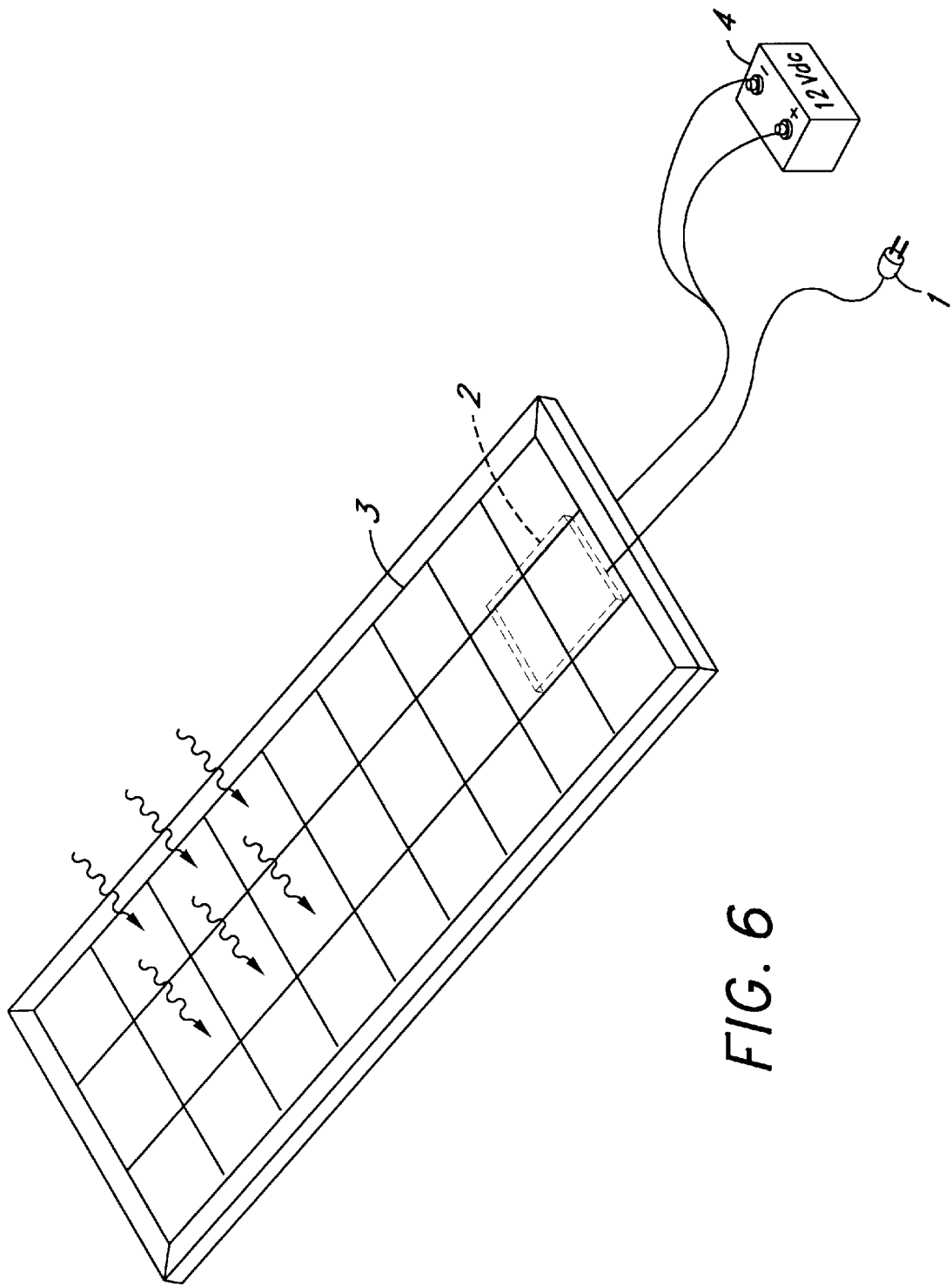
FIG. 6 illustrates an exemplary solar cell array which implements the solar inverter circuit 2 of the present invention.

FIG. 6 illustrates an exemplary solar cell array which implements the solar inverter circuit of the present invention. As shown, the solar inverter circuit 2 may be mounted to the back of a solar cell array 3 panel. An AC source provided via plug 1 provides an AC voltage waveform to the solar inverter circuit 2. Solar energy is received by the solar cell array 3, which in turn generates DC power that is provided to the solar inverter circuit 2. The solar inverter circuit 2 in turn converts the DC power to AC power, which is returned to the AC source at plug 1. In addition, the solar inverter circuit 2 may also comprise a battery charging circuit 2b which enables the solar inverter circuit 2 to also generate DC power for immediate DC applications or for storage in a battery 4.

Implementation of the solar inverter circuit of the present invention provides: (i) conversion of DC solar power to AC power through reference to an AC voltage source, and (ii) generation of additional DC power. Once harnessed, both the AC and DC powers may be utilized immediately, or the DC portion may be stored for later use. The features of immediate applicability and/or storage of the power, along with the versatility of matching the solar power with any AC voltage reference source, enables the solar inverter circuit of the present invention to be used in many applications.

Modifications and variations of the embodiments described above may be made by those skilled in the art while remaining within the true scope and spirit of this invention. Thus, although the present invention has been described in terms of certain preferred embodiments, other embodiments that will be apparent to those of ordinary skill in the art are also within the scope of this invention. Accordingly, the scope of the invention is intended to be defined only by the claims which follow.

What is claimed is:

1. A circuit for converting direct current (DC) power to alternating current (AC) power based on a reference AC voltage signal, comprising:

a first circuit coupled to receive DC power;

a transformer having a first side and a second side, said first side being coupled to receive the reference AC voltage signal; and a second circuit coupled to the second side of said transformer and said first circuit, said second circuit generating a pulse based on the reference AC voltage signal, said second circuit controlling a conversion of the DC power to AC power, wherein an AC current of said converted AC power is opposite in phase with respect to the reference AC voltage signal.

2. The circuit as recited in claim 1, wherein said first circuit comprises a first and a second pair of switching devices, said first pair of switching devices being complementary of said second pair of switching devices.

3. The circuit as recited in claim 2, wherein said switching devices are field effect transistors.

4. The circuit as recited in claim 2, wherein said switching devices are insulated gate bipolar transistor (IGBTs).

5. The circuit as recited in claim 2, wherein said switching devices are gate-turn-off thyristors (GTOs).

6. The circuit as recited in claim 2, wherein said switching devices are bipolar junction transistors (BJTs).

7. The circuit as recited in claim 2, wherein said switching devices are silicon-controlled-rectifiers (SCRs).

8. The circuit as recited in claim 2, wherein said switching devices are TRIACs.

9. The circuit as recited in claim 2, wherein said switching devices are MOS-controlled thyristors (MCTs).

10. The circuit as recited in claim 1, further comprising an array of solar cells that generates the DC power from solar energy.

11. The circuit as recited in claim 1, wherein said converted AC power is supplementary to an existing AC power.

12. The circuit as recited in claim 1, wherein said transformer is an isolation transformer.

13. The circuit as recited in claim 12, further comprising an array of solar cells that generates the DC power from solar energy; and wherein said transformer has a turn ratio that provides an AC voltage on said second side such that an open-circuit voltage of said array of solar cells is 5%–20% larger than an amplitude of the AC voltage on said second side.

14. The circuit as recited in claim 1, wherein said second circuit is a gate controller that generates a first pulse during a first half cycle of the reference AC voltage signal, and a second pulse during a second half cycle of the reference AC voltage signal.

15. The circuit as recited in claim 14, wherein said gate controller circuit includes a control circuit that controls a predetermined time interval between said first pulse and said second pulse.

16. The circuit as recited in claim 15, wherein said predetermined time interval is between 1% to 99% of a period of said reference AC voltage signal.

17. The circuit as recited in claim 15, wherein during said predetermined time interval, said switching devices are non-conducting.

18. The circuit as recited in claim 15, further comprising a connecting circuit and a storage cell, said connecting circuit being coupled to receive said DC power, said connecting circuit providing said DC power to said storage cell for storage during said predetermined time interval.

19. The circuit as recited in claim 15, wherein said storage cell is a battery.

20. The circuit as recited in claim 18, further comprising an array of solar cells that generates the DC power from solar energy, wherein said storage cell comprises a plurality of batteries having a total charged voltage that is less than an open-circuit voltage of the array of solar cells.

21. A method for converting DC power to alternating current (AC) power based on an reference AC voltage signal, comprising the steps of:

(a) providing a first circuit coupled to receive DC power;

(b) providing a transformer having a first side and a second side, said first side being coupled to receive the reference AC voltage signal; and (c) providing a second circuit coupled to the second side of said transformer and said first circuit, said second circuit generating a pulse based on the reference AC voltage signal, said second circuit controlling a conversion of the DC power to AC power, wherein a converted AC current is opposite in phase with respect to the reference AC voltage signal.

22. The method as recited in claim 21, wherein in step (a), said first circuit comprises a first and a second pair of switching devices, said first pair of switching devices being complementary of said second pair of switching devices.

23. The method as recited in claim 22, wherein in step (a), said switching devices are insulated gate bipolar transistor (IGBTs).

24. The method as recited in claim 22, wherein in step (a), said switching devices are gate-turn-off thyristors (GTOs).

25. The method as recited in claim 22, wherein in step (a), said switching devices are bipolar junction transistors (BJTs).

26. The method as recited in claim 22, wherein in step (a), said switching devices are silicon-controlled-rectifiers (SCRs).

27. The method as recited in claim 22, wherein in step (a), said switching devices are TRIACs.

28. The method as recited in claim 22, wherein in step (a), said switching devices are MOS-controlled thyristors (MCTs).

29. The method as recited in claim 21, further comprising the step of generating DC power from solar energy.

30. The method as recited in claim 21, wherein in step (c), said second circuit is a gate controller that generates a first pulse during a first half cycle of the reference AC voltage signal, and a second pulse during a second-half cycle of the reference AC voltage signal.

31. The method as recited in claim 30, further comprising the step controlling a predetermined time interval between said first pulse and said second pulse.

32. The method as recited in claim 31, wherein in the step of controlling said predetermined time interval is between 1% to 99% of a period of said reference AC voltage signal.

33. The method as recited in claim 30, further comprising the step of providing a connecting circuit and a storage cell, said connecting circuit providing said direct current power to said storage cell for storage during said predetermined time interval.

* * * * *